United States Patent [19]

Burgdorf

[11] Patent Number: 4,653,813
[45] Date of Patent: Mar. 31, 1987

[54] DEVICE FOR MONITORING A HYDRAULIC BRAKE SYSTEM FOR VEHICLES

[75] Inventor: Jochen Burgdorf, Offenbach-Rumpenheim, Fed. Rep. of Germany

[73] Assignee: Alfred Teves GmbH, Frankfurt am Main, Fed. Rep. of Germany

[21] Appl. No.: 806,620

[22] Filed: Dec. 9, 1985

[30] Foreign Application Priority Data

Dec. 14, 1984 [DE] Fed. Rep. of Germany ....... 3445565

[51] Int. Cl.$^4$ .................. B60T 11/16; B60T 17/22; B60T 8/02
[52] U.S. Cl. ......................... 303/50; 60/545; 188/1.11; 303/92; 303/100; 303/114; 303/119
[58] Field of Search .................. 303/92, 100, 50–56, 303/93, 10–12, 113–119; 188/151 A, 355–360, 1.11; 60/545, 547.1, 582, 534, 535, 554; 91/391

[56] References Cited

U.S. PATENT DOCUMENTS

| | | | |
|---|---|---|---|
| 4,346,942 | 8/1982 | Leiber | 303/114 X |
| 4,357,055 | 11/1982 | Leiber et al. | 303/52 |
| 4,478,461 | 10/1984 | Leiber | 303/92 |
| 4,482,192 | 11/1984 | Leiber | 303/119 X |
| 4,489,555 | 12/1984 | Leiber | 303/92 X |
| 4,534,171 | 8/1985 | Leiber | 60/554 X |
| 4,550,954 | 11/1985 | Leiber | 303/92 |
| 4,557,528 | 12/1985 | Leiber | 303/92 |
| 4,568,130 | 2/1986 | Leiber | 303/92 |
| 4,580,847 | 4/1986 | Burgdorf | 303/114 X |

FOREIGN PATENT DOCUMENTS 2826471 1/1979 Fed. Rep. of Germany .

Primary Examiner—Douglas C. Butler
Attorney, Agent, or Firm—James B. Raden; William J. Michals

[57] ABSTRACT

A brake system wherein the piston (2) of a master cylinder (1) is actuated by the pressure controlled by a brake valve (6), a monitoring device is provided for detection of fail conditions. The monitoring device comprises a switch (18) which is closed by a trip cam (17) upon an actuating distance ($s_1$) having been traveled by the actuating element (4), and further switches (20, 21), the switch (20) being closed after an actuating travel distance ($s_{21}$) and the switch (21) being closed after an actuating travel distance ($s_{22}$), each by a trip cam (19) at the master cylinder piston (2). If the master cylinder piston (2) has not yet traveled the actuating distance ($s_{21}$) or has already traveled furher than the distance ($s_{22}$) when the switch (18) closes, an evaluating circuit (22) which evaluates the positions of the switches (18, 20, 21) will switch on a signal lamp (23) to indicate a fail condition in the brake system.

2 Claims, 7 Drawing Figures

DEVICE FOR MONITORING A HYDRAULIC BRAKE SYSTEM FOR VEHICLES

BACKGROUND OF THE INVENTION

The present invention relates to a device for monitoring a hydraulic brake system for vehicles, in particular a brake system with anti-skid system, comprising a master brake cylinder for generation of an actuating pressure and a brake valve connectable to a pressure medium source and a reservoir and actuatable by way of a travel simulator.

In hydraulic brake systems of this type, actuation of the brakes is controlled by the brake valve fed with external energy. Direct mechanical actuation of the master brake cylinder only takes place when the external energy supply has failed, in order to prevent a total failure of the brake system. Brake systems of this type are of considerable ease of operation and particularly suitable for an anti-skid system because external energy for effecting the control operations is available. The problem with such brake systems, however, is that errors, such as excessive or too little brake clearance or a leakage of the system, cannot be recognized by the driver due to the distance traveled by the actuating element so that a failure of the brake system can occur without prior warning.

The object of the present invention, therefore, is to create a monitoring device for brake systems of the type initially described which will recognize and indicate fail conditions and errors in the brake system.

SUMMARY OF THE INVENTION

This object is achieved according to the present invention by the fact that the volume intake of the brake system is measured during actuation of the brake up to a predetermined actuating pressure and compared with a lower and an upper set value and that a value falling below the lower set value or exceeding the upper set value is registered and displayed as a fail condition. Thus, a device for monitoring a brake system actuatable by external energy is achieved, which reliably indicates a leakage in the brake circuit, a bad ventilating condition, brake fading, the formation of vapor locks, and a defective clearance. In addition, leakages at the valves of an anti-skid system can be detected.

For monitoring a brake system wherein the piston of the master brake cylinder is pressurizable for actuation of the brake by the actuating pressure of the brake valve, an embodiment of the invention provides that the actuating distances traveled by the actuating element controlling the brake valve and by the master cylinder piston during brake actuation are measured and compared with each other and the falling below or exceeding of a predetermined distance ratio is registered and displayed. This embodiment of the invention allows a particularly simple design of the monitoring device because the actuating pressure is measured by way of the travel distance of the actuating element and the volume intake by way of the travel distance of the master cylinder piston.

In further development of this inventive concept, the actuating distance traveled by the master cylinder piston is measured upon a pre-set distance traveled by the actuating element having been reached. Thus, a simplification of the measuring device is achieved.

A further simplification of the measuring device is rendered possible by the fact that the actuating travel distance of the master cylinder piston is divided into three sections which can be monitored by a measuring device, the middle section corresponding to the normal value required by the brake system, which is fed by way of the master cylinder piston, at a pre-set actuating distance traveled by the actuating element.

Advantageously the measuring device may consist of electric switches which are connected to a control circuit and switched upon predetermined actuating distances having been traveled. Preferably, the switches are arranged in fixed position relative to the housing and actuatable by trip cams at the actuating element and at the master cylinder piston.

According to a further advantageous embodiment of the invention, the master cylinder piston has two trip cams which can cause a double switch to move from a normal position into two switch positions, with the distance between the trip cams corresponding to the middle monitored section of the actuating travel.

According to still another embodiment of the present invention, the master cylinder piston comprises, for actuation of a switch, a trip cam whose axial length corresponds to the middle monitored section of the actuating travel.

The monitoring device provided by the present invention may also comprise, for measuring the volume intake, two switches actuatable one after the other by a trip cam at the master cylinder piston, with one switch being switched upon reaching and the other upon exceeding the middle monitored section of the actuating travel.

In the case of a brake system actuated directly by the pressure controlled by the brake valve, the present invention provides that a volumeter is arranged at the outlet of the brake valve, the reading of said volumeter being compared with the set values at a predetermined distance traveled by the actuating element.

BRIEF DESCRIPTION OF THE DRAWING

Embodiments of the invention are illustrated in the accompanying drawing wherein:

FIG. 3 is a table showing the switch signals of the monitoring device as shown in FIG. 1;

DETAILED DESCRIPTION

Figure 1:
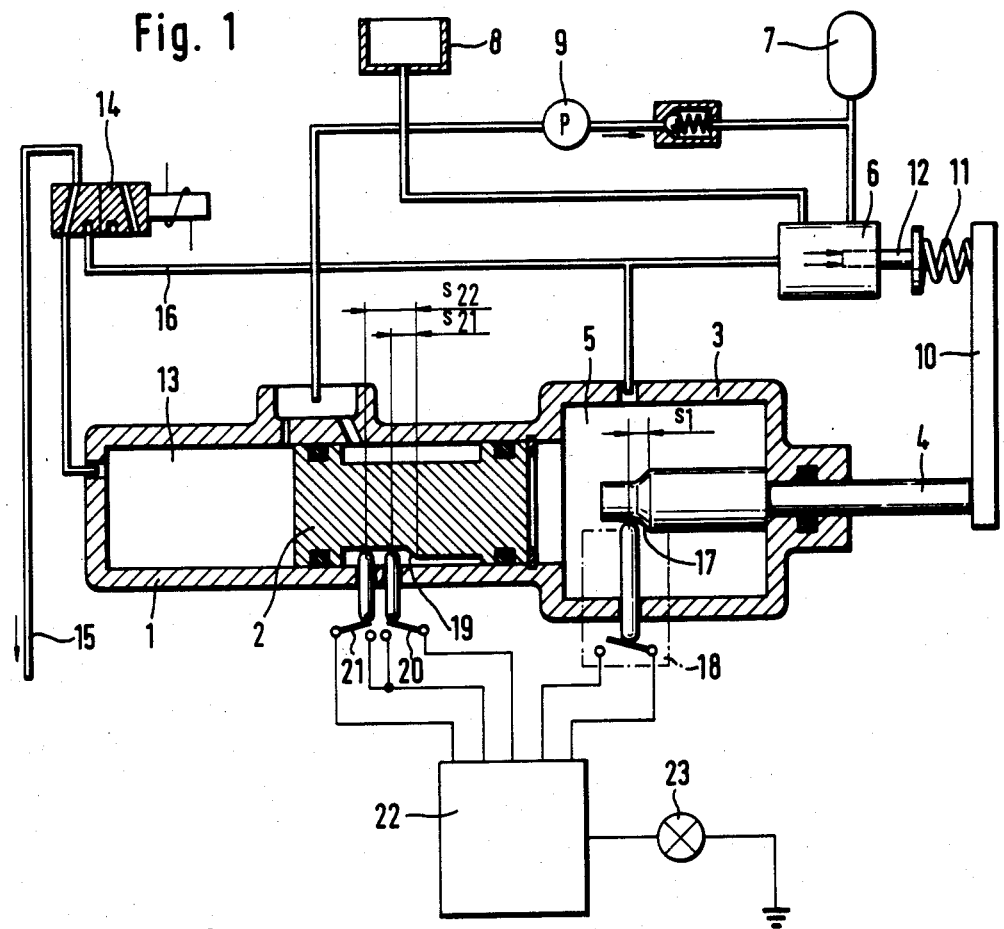
FIG. 1 is a diagrammatic view of a brake actuating device operated by external energy and equipped with a monitoring device according to the present invention.

The brake actuating device illustrated in FIG. 1 is composed of a master brake cylinder 1 with a master cylinder piston 2 and a brake force booster 3 with an actuating element 4 extending into a booster chamber 5 adjacent to the master brake cylinder 1. The pressure in the booster chamber 5 is controlled by a brake valve 6 which is connected to a pressure accumulator 7 and an unpressurized reservoir 8. The pressure accumulator 7 is pressurized by a pump 9. For actuating the brake valve 6, the actuating element 4 comprises an arm 10 which, by way of a simulator spring 11, acts upon a control element 12 designed as reaction piston of the brake valve 6.

From the pressure chamber 13 of the master brake cylinder 1 by way of a main valve 14, a conduit 15 leads to the brakes (not shown) of a vehicle brake system. By means of the electromagnetically actuatable main valve 14, the conduit 15 can be separated from the pressure chamber 13 and connected immediately to the controlled outlet of the brake valve 6 by way of a conduit 16. The main valve 14 is part of an overall anti-skid system (not shown) and which serves to reduce the pressure at the wheel brakes below the actuating pressure controlled by the brake valve down to zero to prevent the vehicle wheels being blocked. When the anti-skid system enters into operation, the main valve 14 is switched so that upon each pressure reduction the actuating pressure can be fed back to the wheel brakes directly by way of the brake valve 6 without using the master brake cylinder 1.

In order to enable fail conditions in the brake system to be recognized, such as defective clearance, insufficient ventilation, leakages, etc., a monitoring device is provided which consists of a switch 18 actuatable by a trip cam 17 of the actuating element 4 and of switches 20, 21 actuatable by a trip cam 19 at the master cylinder piston 2. The brake system is monitored by evaluation of the sequence in which the switches 18, 20, 21 are switched during brake actuation by means of an electronic evaluating circuit 22 which switches on a signal lamp 23 when a fail condition occurs. The closing of the switch 18 occurs upon a distance $s_1$ having been traveled by the actuating element 4. The closing of the switches 20 and 21 occurs upon the distances $s_{21}$ and $s_{22}$, respectively, having been traveled by the master cylinder piston 2.

Figure 2:
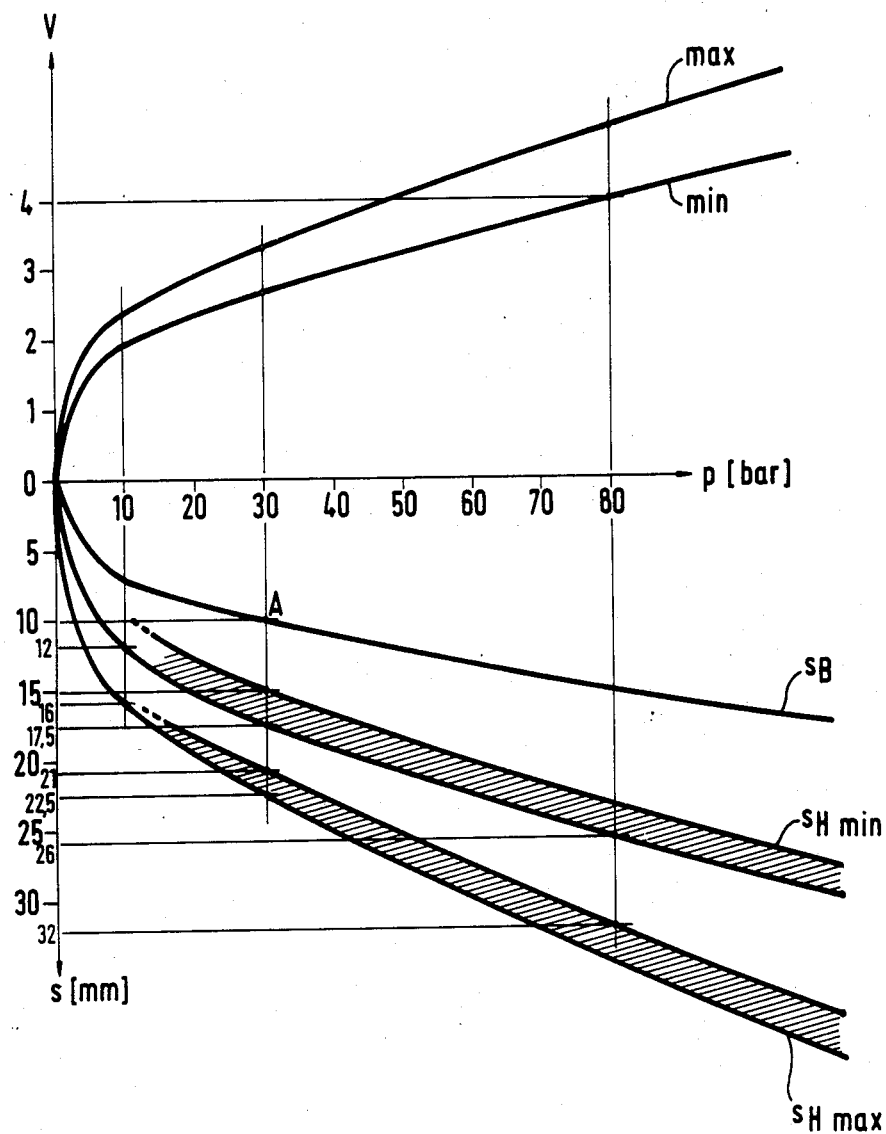
FIG. 2 is a diagram of the volume requirement and of the actuating travel distances of the brake actuating device as shown in FIG. 1.

For description of the mode of operation of the monitoring device, reference is made to the diagram shown in FIG. 2. The upper half of the diagram shows the minimum and maximum volume intake V of the brake system connected to the master brake cylinder 1 relative to the actuating pressure supplied from the brake force booster 3. These limit values permissible for the volume intake result from the dimensions of the brake systems and can be clearly defined. The lower half of the diagram shows the actuating distance $s_B$ traveled by the actuating element 4 relative to the actuating pressure p fed in, as well as the actuating distances $s_{H\,min}$ and $s_{H\,max}$ traveled by the master cylinder piston 2 at minimum and maximum volume intake of the brake system. A hatched area below the line $s_{H\,min}$ and above the line $s_{H\,max}$ represents a safety tolerance for compensation of any measuring inaccuracies.

For monitoring the brake system, the actuating travel distance $s_B$ of the actuating element 4 is compared with the actuating travel distance $s_H$ of the master cylinder piston 2 at a control point A which is reached during most brake applications. In the embodiment described, the control point A is reached at an actuating pressure of the brake force booster of 30 bar. This control point A is sensed by the switch 18 of the monitoring device by the switching distance $s_1$ being equated to the actuating distance $s_B$ traveled by the actuating element at that pressure. The switching distance $s_1$ thus is 10 mm. The switching distances $s_{21}$ and $s_{22}$ of the master cylinder piston 2 at control point A result from the actuating travel distances $s_{H\,min}$ and $s_{H\,max}$ at control point A with the safety tolerances being allowed for. Thus, $s_{21}$ is 15 mm and $s_{22}$ is 22.5 mm. If the actuating distance traveled by the master cylinder piston 2 is between these two values when the switch 18 closes (i.e., if the switch 20 is closed before and the switch 21 after the switch 18) the volume intake of the brake system is normal and there is no fail condition. The switching sequence is recognized by the evaluating circuit 22 and the signal lamp 23 does not light up.

The monitoring device enables three different operating conditions, which are shown in tabular form in FIG. 3, to be evaluated, depending on the sequence in which the switches 18, 20, 21 are switched. The switching sequence is indicated by the numbers 1, 2, 3. The first line shows the switching sequence for normal volume intake. The switching sequence in the second line indicates that the volume intake is too high, and the switching sequence in the third line indicates that the volume intake is too low. Too high or too low a volume intake indicates a fail condition in the brake system. The reason for the volume intake being too high can be a leakage, a bad ventilating condition, too much clearance, or fading with formation of vapor locks within the brake system connected to the master brake cylinder 1. The volume intake can be too low if the main valve 14 is leaky and pressure medium from the conduit 16 gets into the brake system. A leakage occurring when the main valve 14 is switched during anti-skid control and permitting pressure medium form the brake system to get into the isolated pressure chamber 13 of the master cylinder 1 can also be detected, if by means of the booster pressure, which is higher than the master cylinder pressure, the master cylinder piston returns and the switch 20 is switched back. Also, too little clearance and the resulting danger of a brake being blocked can be the reason for too low a volume intake.

Figure 4:
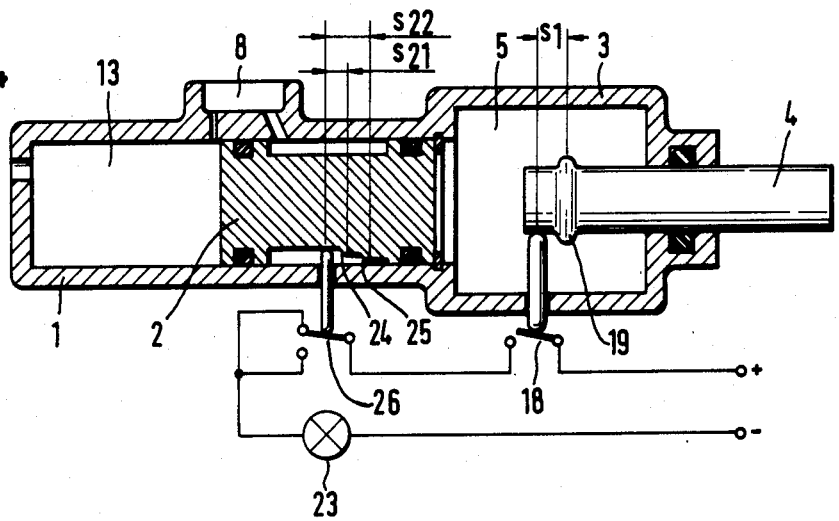
FIG. 4 is a diagrammatic view of a brake actuating device equipped with a monitoring device with double switch, shown with the brake in released position.
Figure 5:
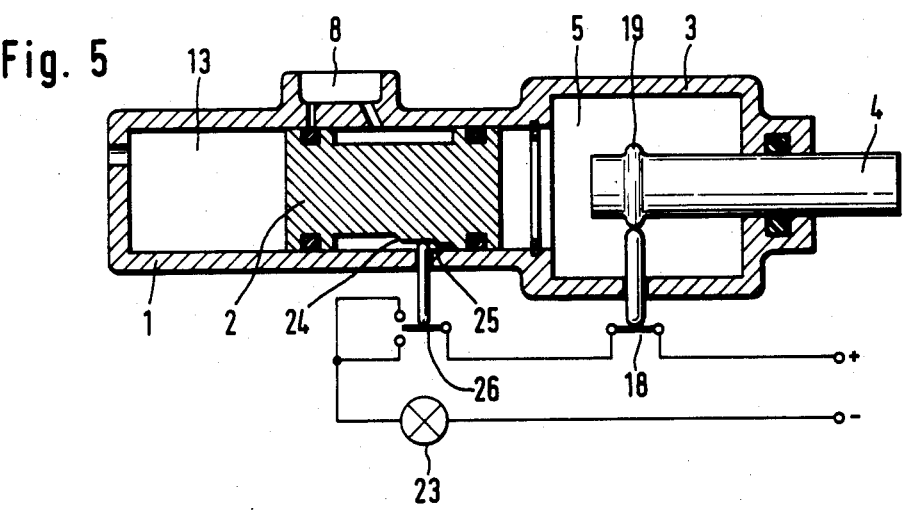
FIG. 5 shows a brake actuating device and monitoring device according to FIG. 4 in monitoring position.

The basis setup of the brake actuating device of the embodiment illustrated in FIGS. 4 and 5 corresponds to that of the brake actuating device as shown in FIG. 1. Like parts have therefore been assigned like reference numerals. In this embodiment the master cylinder piston 2 comprises two trip cams 24, 25 by which a double switch 26 can be switched from its normal position, in which it is closed, to an open position and to a second closed position. The trip cams 24 and 25 are located at the distances $s_{21}$ and $s_{22}$, respectively, before the actuating rod of the switch 26. The switch 26 is connected to a voltage source in series with the switch 18 and a signal lamp 23.

FIG. 4 shows the brake actuating device in idle position with the brake released. The switch 18 is open and the electric circuit is interrupted. In FIG. 5, the brake actuating device is shown in an operative position in which the actuating element 4 has reached the monitoring position and the pressure fed in corresponds to the control pressure. The switch 18 has been closed by the trip cam 19. The volume intake in the brake system connected to the master brake cylinder 1 is normal so that the double switch 26 was opened previously before the switch 18 closed and is still in its open position. The electric circuit is still interrupted and the signal lamp 23 does not light up. In case of too little volume intake in the operative position shown in FIG. 5, the trip cam 24 would not yet have opened the double switch 26 and the signal lamp 23 would have been switched on. Likewise, in case of too much volume intake the double switch 26 would already have been closed again by the trip cam 25 and the signal lamp would have been switched on. In the described embodiment of the monitoring device in order to avoid that the signal lamp 23 is switched on only briefly, a holding relay can be provided additionally to allow the on-position of the signal lamp 23 to be maintained. The advantage of the monitoring device as shown in FIGS. 4 and 5 is that the switch signals of the monitoring device are combined in one signal so that no particular evaluating circuit is needed.

Figure 6:
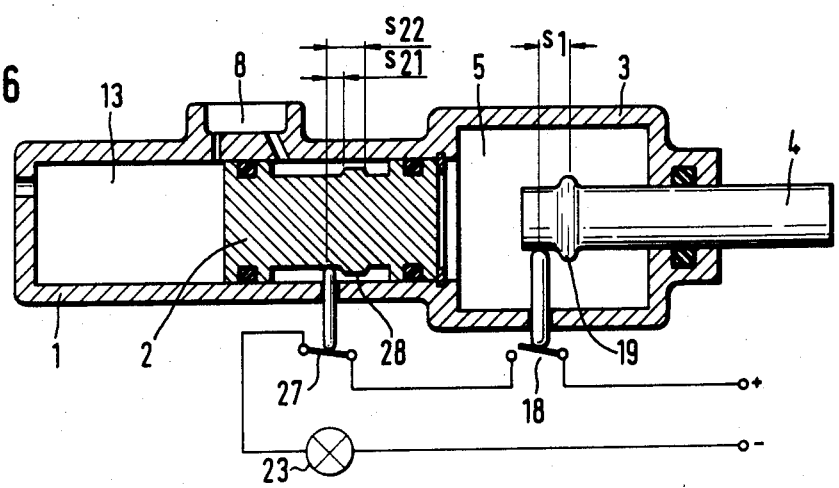
FIG. 6 is a diagrammatic view of a brake actuating device equipped with a monitoring device with simple switch; and, FIG. 7 is a diagrammatic view of a brake actuating device equipped with a monitoring device with volumeter.

In the embodiment illustrated in FIG. 6, the basic setup of which also corresponds to that of the embodiments described hereinbefore, a single switch 27 is provided for sensing the actuating travel of the master cylinder piston 2, said switch being switched by a trip cam 28 whose axial width corresponds to the difference between the switching distances $s_{21}$ and $s_{22}$—i.e., the middle section betweed the two switch points at control point A. In case of normal volume intake, the trip cam 28 keeps the switch 27 open when the trip cam 19 at the actuating element 4 actuates the switch 18. If the volume intake during actuation of the brake exceeds or falls below the normal volume, the actuating rod of the switch 27 is skipped or not yet reached by the trip cam 28 as the switch 18 closes, so that the switch 27 is also closed and the signal lamp 23 is switched on. In this embodiment as well, a locking relay can be used to maintain the signal lamp 23 in on-position.

Figure 7:
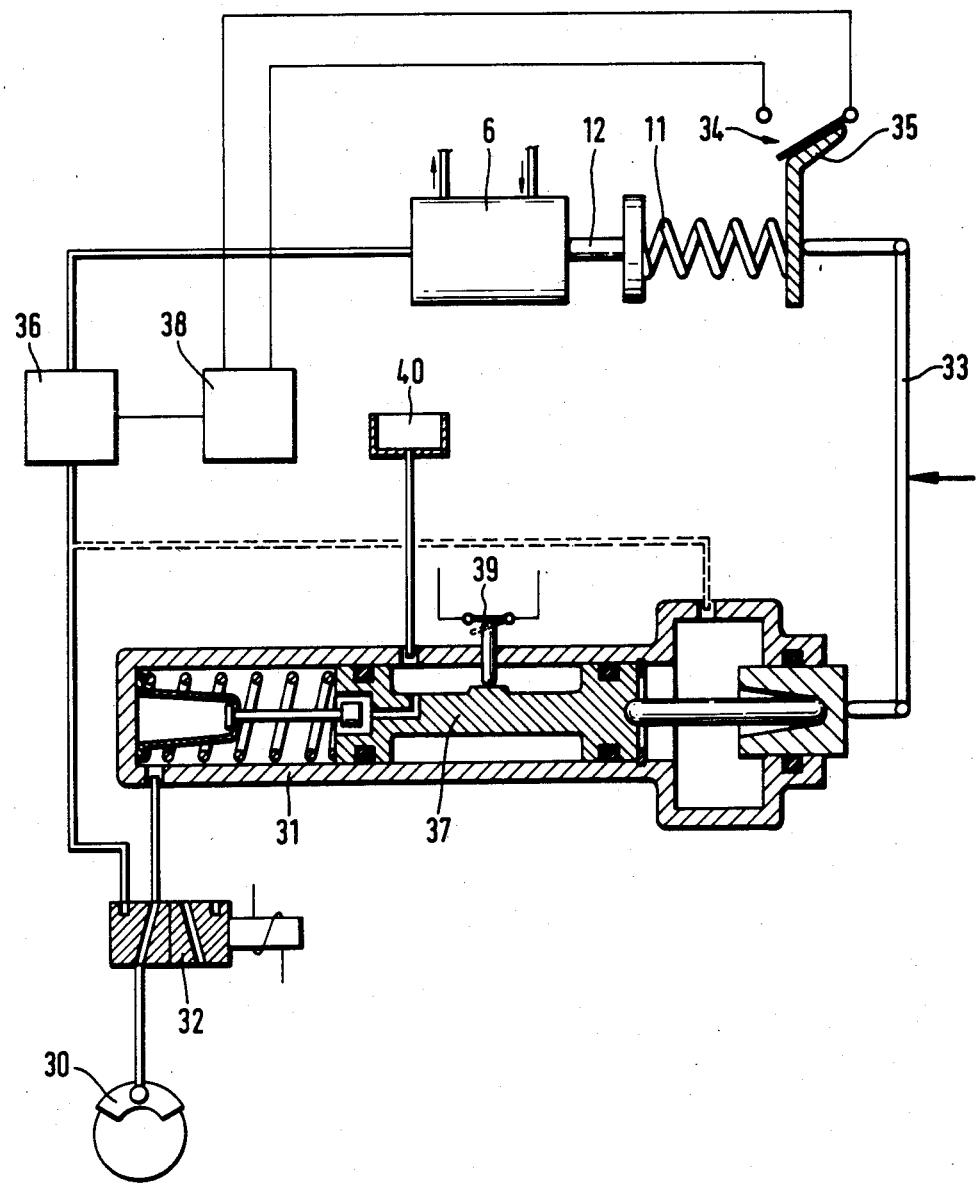

FIG. 7 shows a section of a brake system wherein the wheel brakes 30 are actuated directly by the pressure from a pressure medium source (not illustrated) controlled by a brake valve 6 with a simulator spring 11 and a reaction piston 12. Only for emergency actuation in the event of a failure of the energy supply from the pressure mediums source, a master brake cylinder 31 is provided which is connected with the wheel brakes 30 by way of a solenoid valve 32. The brake valve 6 and the master brake cylinder are actuated by a common actuating element 33. The monitoring device in this embodiment comprises a switch 34 which is closed by a trip cam 35 provided at the end of the actuating element 33 acting upon the simulator spring 11, upon said trip cam having covered the switching distance $s_1$. Furthermore, for control of the volume intake of the brake system a volumeter 36 is provided in the flow path of the pressure medium supplied by the brake valve 6.

FIG. 7 shows the individual components of the brake system with the brake in released position. The wheel brakes 30 are connected with the master brake cylinder 31 by way of the solenoid valve 32 and communicate in the usual way by way of the open compensating valve of the master brake cylinder 31 with an unpressurized compensating reservoir 40. Operation of the actuating element 33 first causes the master cylinder piston 37 to move until the compensating valve is closed and a lower pressure built up. Thereafter, a pressure or distance controlled switch, for example, the stop light switch, actuates the solenoid valve 32, thus causing the master brake cylinder 31 to be disconnected from the wheel brakes 30 and the wheel brakes 30 to be connected with the brake valve 6. Since the master cylinder piston 37 cannot move any further, further actuation of the actuating element 33 causes an increase of the pressure controlled by the brake valve 6, with the simulator spring being compressed more and more. The volume of pressure medium thus fed into the brake system by way of the brake valve 6 is measured by the volumeter 36 and, as the switch 34 is closed by the trip cam 35, compared with an upper and a lower set value by an evaluating circuit 38. If the measured volume intake is between the set values, the brake system functions correctly.

In the event of a breakdown of the energy supply, the solenoid valve 32 is switched back into the position illustrated and the brake can be actuated only by means of the master brake cylinder 31.

Since a leakage at the inlet of the solenoid valve 32 to the master cylinder cannot be detected by monitoring the volume intake, an additional alarm swtich 39 is provided within the master brake cylinder 31. The alarm switch is actuated by the master cylinder piston 37 if the latter advances too far into the master cylinder bore.

What is claimed is:

1. A device for monitoring a hydraulic brake system for vehicles equipped with anti-skid system, comprising a master brake cylinder for generation of an actuating pressure and a brake valve connectable to a pressure medium source and a reservoir and being actuatable by way of a travel simulator, said device measuring the volume intake of the brake system (30) during brake actuation up to a predetermined actuating pressure (p) and comparing the measured value with a lower and an upper set value, and wherein a measured value falling below the lower set value or exceeding the upper set value is registered and displayed as a fail condition, said device comprising, in combination:

a booster chamber (5) adjacent to said master brake cylinder;

an actuating element (4) movably mounted in said booster chamber (5) with said actuating element (4) being connected to said travel simulator for movement therewith, and said actuating element (4) having a trip cam surface thereon;

a master cylinder piston (2) movably mounted in said master brake cylinder with said piston (2) having a trip cam surface thereon;

a first switch having a pair of contacts which are actuated by a cam element which engages said trip cam surface of said actuating element (4);

second and third switches each having a pair of contacts which are actuated by a cam element which engages said trip cam surface of said piston (2) is moved into a corresponding position; and an evaluation circuit having a plurality of inputs respectively coupled to said contacts of said switches for providing an output signal indicative of a predetermined actuation sequence of said switches.

2. The device as defined in claim 1, wherein the piston of the master brake cylinder is pressurizable by the actuating pressure of the brake valve for operation of the brake system, and wherein the distances ($s_1$, $s_{21}$, $s_{22}$) traveled by the actuating element (4) controlling the brake valve (6) and by the master cylinder piston (2) during brake actuation are measured and compared with one another and the falling below or exceeding of a predetermined distance ratio is registered and displayed.

* * * * *